H. L. Palmer,

Fruit Can.

No. 105,484. Patented July 19. 1870.

United States Patent Office.

HENRY L. PALMER, OF STILLWATER, NEW YORK.

Letters Patent No. 105,484, dated July 19, 1870.

IMPROVEMENT IN PRESERVING VARIOUS ARTICLES OF FOOD.

The Schedule referred to in these Letters Patent and making part of the same.

I, HENRY L. PALMER, of Stillwater, in the county of Saratoga and State of New York, have invented an Improved Mode of Preserving Food, of which the following is a specification.

Nature and Objects of the Invention.

The invention consists of a collapsible capsule, which is charged with food of a semi-fluid condition, and hermetically sealed, in such way that by removing the cap or stopper a portion may be ejected by pressure on the sides; the vessel retaining the form imparted, and not allowing the entrance of air. The stopper is then replaced, which again closes the capsule effectually.

Description of the Accompanying Drawing.

Figure 1:
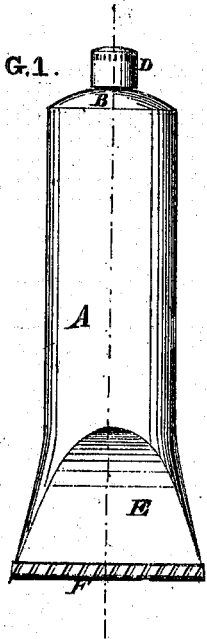
Figure 2:
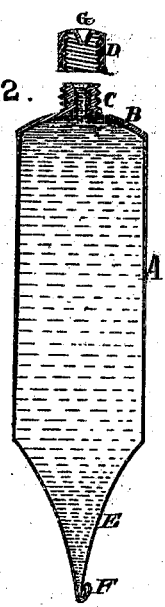

Figure 1 is an elevation.
Figure 2 is a longitudinal central section.

General Description.

The capsule A is made of some flexible material, such as tin, made up into the shape required, in any usual way.

A good method is to make it tubular, one end being closed by a breast, B, on which is a nipple, C, threaded to receive the cap D.

The lower end, E, of the capsule is bent flat, smeared with wax or paraffine, and seamed or double seamed, so as to make it perfectly air and water-tight.

The nipple C is hollow, to form a canal for the expulsion of the contents.

The canal terminates in a valve-seat, which receives a little conical plug, G, made by inverting the plate, which forms the top of the cap.

The plug is formed by a swage or punch, the metal being soft and yielding, and fitting into the valve-seat as the cap is screwed on.

The edible contents of the capsule may consist of condensed milk, meat extracts, essence of coffee or tea, jellies, &c.

These articles of food are in a semi-fluid condition, and are by this means made conveniently accessible, to use in small quantities from time to time, closing up the vessel again in its former close order.

It may be well to put a little paraffine or wax around the base of the nipple, so that the edge of the cap closes down upon it, assisting in making the joint air-tight.

Claim.

What I claim as new is—

The flexible and compressible capsule, for containing articles of food in a semi-fluid condition, which are therein hermetically inclosed, as described.

H. L. PALMER.

Witnesses:
EDWARD H. KNIGHT,
JAS. MELDRUM.